（12）United States Patent
Kwon et al.

(10) Patent No.: US 9,379,369 B2
(45) Date of Patent: *Jun. 28, 2016

(54) INTEGRATED ELECTRODE ASSEMBLY AND SECONDARY BATTERY USING SAME

(75) Inventors: Yohan Kwon, Daejeon (KR); Sung-Kyun Chang, Daejeon (KR); Seung-Tae Hong, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/979,911

(22) PCT Filed: Feb. 8, 2012

(86) PCT No.: PCT/KR2012/000906
§ 371 (c)(1),
(2), (4) Date: Feb. 18, 2014

(87) PCT Pub. No.: WO2012/111935
PCT Pub. Date: Aug. 23, 2012

(65) Prior Publication Data
US 2014/0242441 A1    Aug. 28, 2014

(30) Foreign Application Priority Data
Feb. 15, 2011   (KR) ................. 10-2011-0013072

(51) Int. Cl.
*H01M 2/16*    (2006.01)
*H01M 10/04*   (2006.01)
(Continued)

(52) U.S. Cl.
CPC .......... *H01M 2/1686* (2013.01); *H01M 2/1653* (2013.01); *H01M 2/1673* (2013.01);
(Continued)

(58) Field of Classification Search
CPC   H01M 2/1686; H01M 2/1653; H01M 2/1673
USPC ........................................ 429/144
See application file for complete search history.

(56) References Cited

U.S. PATENT DOCUMENTS 8,993,174 B2 *  3/2015  Kwon ................ H01M 10/052
                                              429/144
2002/0042001 A1  4/2002  Lee
(Continued)

FOREIGN PATENT DOCUMENTS

CN        1612377 A      5/2005
JP        H-11354157 A   12/1999
(Continued)

OTHER PUBLICATIONS

International Search Report for Application No. PCT/KR2012/000906 dated Sep. 28, 2012.

*Primary Examiner* — Nicholas P D'Aniello
(74) *Attorney, Agent, or Firm* — Lerner, David, Littenberg, Krumholz & Mentlik, LLP (57) ABSTRACT

Disclosed herein is an integrated electrode assembly including a cathode, an anode, and a separation layer disposed between the cathode and the anode. The cathode, the anode, and the separation layer are integrated with each other. The separation layer includes 3 phases including a liquid-phase component containing an ionic salt, a solid-phase component supporting the separation layer between the cathode and the anode, and a polymer matrix in which linear polymers and cross-linked polymers form a viscoelastic structure with the liquid-phase component and the solid-phase component being incorporated in the polymer matrix. The polymer matrix is coupled to each of the cathode and the anode. The liquid-phase component of the separation layer flows into the electrodes (i.e., the cathode and anode) during preparation of the integrated electrode assembly to greatly improve wetting properties of the electrodes and to increase ionic conductivity of the electrodes.

23 Claims, 2 Drawing Sheets (51) Int. Cl.
    *H01M 10/052* (2010.01)
    *H01M 10/0585* (2010.01)

(52) U.S. Cl.
    CPC ........ *H01M10/0436* (2013.01); *H01M 10/052* (2013.01); *H01M 10/0585* (2013.01); *Y02E 60/122* (2013.01); *Y02P 70/54* (2015.11); *Y02T 10/7011* (2013.01)

(56) References Cited

U.S. PATENT DOCUMENTS

2005/0095504 A1* 5/2005 Kim et al. ............... 429/246
2005/0234177 A1 10/2005 Zaghib et al.

FOREIGN PATENT DOCUMENTS

| | | | |
|---|---|---|---|
| JP | 2000-173607 | A | 6/2000 |
| JP | 2000-294288 | A | 10/2000 |
| JP | 2001-256826 | A | 9/2001 |
| JP | 2002-187925 | A | 7/2002 |
| JP | 2002-367677 | A | 12/2002 |
| JP | 2006-501600 | A | 1/2006 |
| KR | 20020080797 | A | 10/2002 |
| KR | 20050041661 | A | 5/2005 |
| KR | 20060042326 | A | 5/2006 |
| KR | 20070010962 | A | 1/2007 |
| KR | 20080010166 | A | 1/2008 |
| KR | 20090004135 | A | 1/2009 |

* cited by examiner

INTEGRATED ELECTRODE ASSEMBLY AND SECONDARY BATTERY USING SAME

CROSS-REFERENCE TO RELATED APPLICATIONS

The present application is a national phase entry under 35 U.S.C. §371 of International Application No. PCT/KR2012/000906 filed Feb. 8, 2012, published in Korean, which claims priority from 10-2011-0013072 filed Feb. 15, 2011, all of which are hereby incorporated herein by reference.

TECHNICAL FIELD

The present invention relates to an integrated electrode assembly and a secondary battery using the same and more particularly to an integrated electrode assembly including a cathode, an anode, and a separation layer disposed between the cathode and the anode, wherein the cathode, the anode, and the separation layer are integrated with each other, the separation layer includes 3 phases including a liquid-phase component containing an ionic salt, a solid-phase component supporting the separation layer between the cathode and the anode, and a polymer matrix in which linear polymers and cross-linked polymers form a viscoelastic structure with the liquid-phase component and the solid-phase component being incorporated in the polymer matrix, the polymer matrix is coupled to each of the cathode and the anode, and the liquid-phase component of the separation layer flows into the electrodes (i.e., the cathode and the anode) during preparation of the integrated electrode assembly to greatly improve wetting properties of the electrodes and to increase ionic conductivity of the electrodes.

BACKGROUND ART

Increasing price of energy sources due to depletion of fossil fuels and an increased interest in environmental pollution have brought about increased demand for environmentally friendly alternative energy sources as an indispensable element for future life. Studies on various power generation technologies such as nuclear, solar, wind, and tidal power generation technologies have continued to be conducted and power storage devices for more efficient use of such generated energy also continue to be of great interest. Secondary batteries have been used as such power storage devices. Among secondary batteries, lithium secondary batteries have begun to be used for mobile devices and, along with increasing demand for reduced weight and high voltage and capacity, recently, use of lithium secondary batteries has been significantly extended to electric vehicles, hybrid electric vehicles, and auxiliary power sources based upon smart grid.

However, numerous challenges, which have yet to be addressed, remain before lithium secondary batteries can be used as large-capacity power sources. One important challenge is to improve energy density and increase safety. Another important challenge is to reduce process time and to achieve uniform wetting for large-area electrodes. Many researchers have conducted intensive studies on materials that can satisfy low cost requirements while increasing energy density and have also put effort into studies on materials for improving safety.

Ni-based or Mn-based materials having higher capacity than $LiCoO_2$, which has been conventionally used, are typical examples of materials being studied for energy density improvement. Materials that are based on Li alloying reactions with Si or Sn rather than based on intercalation reactions are typical examples of materials for anodes being studied as alternatives to conventional graphite-based materials.

A stable olivine-based cathode active material such as $LiFePO_4$, a cathode active material such as $Li_4Ti_5O_{12}$, or the like have been studied to improve safety. However, such materials for safety improvement inherently have a low energy density and do not fundamentally solve safety problems associated with the structure of lithium secondary batteries.

Secondary battery safety may be largely divided into internal safety and external safety and may further be divided into electrical safety, impact safety, and thermal safety. Occurrence of safety problems commonly entails temperature increase, which necessarily results in contraction of a stretched separator that is generally used.

Although some batteries use an unstretched solid electrolyte to electrically separate the cathode and the anode from one another, the batteries do not provide desired battery performance, for example, due to limited ionic conductivity of the solid.

Thus, there is a great need to provide a battery structure that prevents short-circuiting due to separator contraction and provides excellent battery performance.

DISCLOSURE

Technical Problem

Therefore, the present invention has been made to solve the above and other technical problems that have yet to be resolved.

As a result of a variety of extensive and intensive studies and various experiments, the present inventors have found that an integrated electrode assembly, which includes a separation layer including three phases including a liquid-phase component containing an ionic salt, a solid-phase component supporting the separation layer between a cathode and an anode, and a polymer matrix, in which linear polymers and cross-linked polymers form a viscoelastic structure with the solid-phase component and the liquid-phase component being incorporated in the polymer matrix, prevents short-circuiting due to separator contraction and also greatly improves wetting properties of the electrodes and increases ionic conductivity since the liquid-phase component of the separation layer flows into the electrodes during preparation of the electrode assembly. The present invention has been completed based on this finding.

Technical Solution

Therefore, an integrated electrode assembly in accordance with the present invention includes a cathode, an anode, and a separation layer disposed between the cathode and the anode, wherein the cathode, the anode, and the separation layer are integrated with each other, the separation layer includes 3 phases including a liquid-phase component containing an ionic salt, a solid-phase component supporting the separation layer between the cathode and the anode, and a polymer matrix in which a linear polymer and a cross-linked polymer form a viscoelastic structure with the liquid-phase component and the solid-phase component being incorporated in the polymer matrix, the polymer matrix is coupled to each of the cathode and the anode, and the liquid-phase component of the separation layer flows into the electrodes (i.e., the cathode and the anode) during preparation of the integrated electrode assembly to greatly improve wetting properties of the electrodes and to increase ionic conductivity of the electrodes.

Experiments conducted by the present inventors showed that the internal risk of the secondary battery is highest when the secondary battery is in a charged state with increased energy and, when the secondary battery is in a charged state, short-circuiting may be caused by separator contraction or the like in four situations: (1) where a charged cathode and a charged anode contact each other, (2) where a charged cathode and an anode current collector contact each other, (3) where an anode current collector and a cathode current collector contact each other, and (4) where a cathode current collector and a charged anode contact each other.

Experiments conducted in all of the above situations with charged electrodes in a dry room showed that most serious thermal runaway occurred upon contact between a charged anode and a cathode current collector, contrary to what was expected. Through intensive study, we found that such thermal runaway was caused by, for example, a rapid exothermic reaction of $4Al+3O_2 \rightarrow 2Al_2O_3$ at an Al foil which serves as a cathode current collector. The shapes of Al foils were hard to identify in all occurrences of battery explosion.

Although the experiments showed that thermal runaway occurred only when a charged anode and a cathode current collector contacted each other, one cannot conclude that the other three situations are safe. In batteries, any contact between portions of a cathode and an anode is risky.

On the other hand, the integrated electrode assembly according to the present invention has excellent high-temperature safety since a polymer matrix and a solid-phase component do not contract at high temperature, preventing the occurrence of mishaps such as explosion as occurred in the above experiments.

In addition, it is possible to increase ionic conductivity of the electrodes (i.e., the anode and cathode), thereby improving battery performance, since the liquid-phase component flows into and impregnates the electrodes in an electrode assembly preparation process, for example, in a lamination process. Further, since the electrodes are uniformly wetted by electrolyte, it is possible to minimize electrode degradation caused by non-uniform permeation of electrolyte, which is the most serious problem associated with large-area electrodes. Accordingly, the electrolyte state of the electrode assembly of the present invention may be defined such that a partial liquid-phase component derived from the separation layer is included or incorporated in the electrodes. Here, the amount of the liquid-phase component derived from the separation layer which is included or incorporated in the electrodes is not particularly limited. For example, the amount of the liquid-phase component included or incorporated in the electrodes may be 10 to 90% based on the total amount of the liquid-phase component included in the electrode assembly.

In addition, according to the present invention, the separation layer includes a polymer matrix in which linear polymers and cross-linked polymers form a viscoelastic structure with the solid-phase component and the liquid-phase component being incorporated in the polymer matrix. Although the volumes of the electrodes repeatedly expand and contract during charge/discharge of the battery, the viscoelastic structure compensates for such volume changes, thereby achieving high durability and improving cycle properties.

Generally, a highly cross-linked membrane including a single cross-linked structure tends to exhibit low ionic conductivity due to limitations in the mobility of polymer chains, which affects ionic movement, and also tends to exhibit brittleness when considering mechanical properties.

On the other hand, the viscoelastic structure can achieve high ionic conductivity since polymer chains have suitable fluidity due to linear polymers. The viscoelastic structure can also have elasticity and exhibit excellent mechanical properties since linear polymers connect cross-linked points which cross-linked polymers form in the matrix.

In a preferred embodiment, the viscoelastic structure may be formed such that independent gels including cross-linked polymers are physically connected to each other by linear polymers with the viscoelastic structure being impregnated with a liquid-phase component.

That is, independent gels, each including cross-linked polymers, form cross-linked points, respectively, and the cross-linked points are physically connected to each other by linear polymers to form a network and therefore the viscoelastic structure may be impregnated with a high content of liquid-phase component.

The linear polymers may provide a physical connection structure, for example, in the form of parts of the linear polymers permeating into the gels of cross-linked polymers. This structure may be more suitable for formation of the network structure described above. The size of the parts of the linear polymers that permeate into the gels of cross-linked polymers is preferably less than 50% and more preferably 5 to 45% based on the total size of the linear polymers.

In the present invention, the weight ratio of the liquid-phase component to the polymer matrix is preferably from 3:7 to 9:1. When the content of the liquid-phase component is excessively low, an insufficient amount of liquid-phase component may flow into the electrodes, failing to increase ionic conductivity of the electrodes. Conversely, when the content of the liquid-phase component is excessively high, an excess of liquid-phase component may negatively affect the process. Therefore, the weight ratio of the liquid-phase component to the polymer matrix is more preferably from 5:5 to 8:2.

The weight ratio of the linear polymer to the cross-linked polymer in the polymer matrix is preferably 1:9 to 8:2 although the weight ratio of the linear polymer to the cross-linked polymer is not particularly limited so long as a viscoelastic structure can be formed. An excessively low or high content of linear polymer is undesirable since this reduces elasticity and degrades mechanical properties, reducing impregnation performance of the liquid-phase component. Therefore, the weight ratio of the linear polymer to the cross-linked polymer in the polymer matrix is more preferably 3:7 to 7:3.

The separation layer preferably includes 2 to 80% by weight of the solid-phase component based on the weight of the polymer matrix. When the separation layer includes less than 2% by weight of the solid-phase component based on the weight of the polymer matrix, disadvantageously, the effects of supporting the separation layer, for example, mechanical strength of the separation layer, may be insufficient. When the separation layer includes more than 80% by weight of the solid-phase component based on the weight of the polymer matrix, disadvantageously, ionic conductivity may be decreased, reducing battery performance, and brittleness may occur during charge/discharge due to high rigidity. Therefore, the separation layer more preferably includes 20 to 50% by weight of the solid-phase component based on the weight of the polymer matrix.

Although the composition of the liquid-phase component is not particularly limited so long as the liquid-phase component can partially flow into the electrodes, increasing ionic conductivity of the electrodes, the liquid-phase component is preferably an electrolyte containing an ionic salt.

For example, the ionic salt may include, but is not limited to, a lithium salt and the lithium salt may include, but is not limited to, at least one selected from the group consisting of LiCl, LiBr, LiI, LiClO$_4$, LiBF$_4$, LaB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, and lithium tetraphenylborate.

The electrolyte may include, but is not limited to, at least one selected from the group consisting of ethylene carbonate, propylene carbonate, butylene carbonate, vinylene carbonate, diethyl carbonate, dimethyl carbonate, ethyl methyl carbonate, gamma-butyrolactone, sulfolane, methyl acetate, and methyl propionate.

The solid-phase component is a solid compound that is not reactive with lithium ions and preferably includes solid-phase particles having a mean particle diameter of 10 nm to 5 μm. When the mean particle diameter of the solid-phase component is too small, disadvantageously, the solid-phase component may be present in the form of clusters, resulting in a failure to properly support the separation layer. Conversely, when the mean particle diameter of the solid-phase component is too great, disadvantageously, the thickness of the separation layer may be greater than needed. Therefore, the mean particle diameter of the solid-phase component is more preferably 50 nm to 200 nm.

In a preferred embodiment, the solid compound may include, but is not limited to, at least one selected from the group consisting of an oxide, a nitride, and a carbide that are not reactive with lithium ions.

Preferred examples of the oxide that is not reactive with lithium ions may include, without being limited to, at least one selected from the group consisting of MgO, TiO$_2$ (rutile) and Al$_2$O$_3$.

Although the type of the linear polymer included in the polymer matrix in the present invention is not particularly limited, preferred examples of the polymer include at least one selected from the group consisting of a polyoxide-based non-cross-linked polymer and a polar non-cross-linked polymer.

Non-limiting examples of the polyoxide-based non-cross-linked polymer include at least one selected from the group consisting of poly(ethylene oxide), poly(propylene oxide), poly(oxymethylene), and poly(dimethylsiloxane).

Non-limiting examples of the polar non-cross-linked polymer include at least one selected from the group consisting of polyacrylonitrile, poly(methyl methacrylate), poly(vinyl chloride), poly(vinylidene fluoride), poly(vinylidenefluoride-co-hexafluoropropylene), poly(ethylene imine), and poly(p-phenylene terephthalamide).

The cross-linked polymer included in the polymer matrix in the present invention may include a polymer obtained from monomers having at least two functional groups or a copolymer obtained from monomers having at least two functional groups and polar monomers having one functional group.

Although the type of the monomers having at least two functional groups is not particularly limited, the monomers preferably include at least one selected from the group consisting of trimethylolpropane ethoxylate triacrylate, polyethylene glycol dimethacrylate, polyethylene glycol diacrylate, divinylbenzene, polyester dimethacrylate, divinyl ether, trimethylolpropane, trimethylolpropane trimethacrylate, and ethoxylated his phenol A dimethacrylate.

Although the type of the polar monomers having one functional group is not particularly limited, the polar monomers preferably include at least one selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

In the electrode assembly of the present invention, the cathode may be produced, for example, by adding a cathode mix including a cathode active material to a solvent such as NMP to prepare a slurry and applying the slurry to a cathode current collector, followed by drying. Optionally, the cathode mix may further include a binder, a conductive material, a filler, a viscosity controller, and an adhesion promoter.

The cathode current collector is generally manufactured to a thickness of 3 to 500 μm. Any cathode current collector may be used without particular limitation so long as high conductivity is provided without causing chemical changes in the battery. Examples of the cathode current collector include stainless steel, aluminum, nickel, titanium, sintered carbon, or aluminum or stainless steel surface-treated with carbon, nickel, titanium or silver. Similar to the anode current collector, the cathode current collector may include fine irregularities on the surface thereof so as to enhance adhesion to the cathode active material. In addition, the cathode current collector may be used in various forms such as a film, a sheet, a foil, a net, a porous structure, a foam and a nonwoven fabric.

The cathode active material is a lithium transition metal oxide including two or more transition metals as a substance that causes electrochemical reaction, and examples thereof include, but are not limited to, layered compounds such as lithium cobalt oxide (LiCoO$_2$) or lithium nickel oxide (LiNiO$_2$) substituted by one or more transition metals, lithium manganese oxide substituted by one or more transition metals, lithium nickel-based oxides represented by the formula LiNi$_{1-y}$M$_y$O$_2$ (in which M=Co, Mn, Al, Cu, Fe, Mg, B, Cr, Zn or Ga, the lithium nickel-based oxide including at least one of the elements, and 0.01≤y≤0.7), lithium nickel cobalt manganese composite oxides represented by the formula Li$_{1+z}$Ni$_b$Mn$_c$Co$_{1-(b+c+d)}$M$_d$O$_{(2-e)}$A$_e$ such as Li$_{1+z}$Ni$_{1/3}$CO$_{1/3}$Mn$_{1/3}$O$_2$ or Li$_{1+z}$Ni$_{0.4}$Mn$_{0.4}$Co$_{0.2}$O$_2$ (in which −0.5≤z≤0.5, 0.1≤b≤0.8, 0.1≤c≤0.8, 0≤d≤0.2, 0≤e≤0.2, b+c+d<1, M=Al, Mg, Cr, Ti, Si or Y, A=F, P or Cl), and olivine-based lithium metal phosphates represented by the formula Li$_{1+x}$M$_{1-y}$M'$_y$PO$_{4-z}$X$_z$ (in which M=a transition metal, preferably, Fe, Mn, Co or Ni, M'=Al, Mg or Ti, X=F, S or N, −0.5≤x≤+0.5, 0≤y≤0.5, and 0≤z≤0.1).

Examples of the binder include polytetrafluoroethylene (PTFE), polyvinylidene fluoride (PVDF), cellulose, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohols.

Any conductive material may be used without particular limitation so long as suitable conductivity is provided without causing chemical changes in the battery. Examples of the conductive material include graphite, carbon blacks such as acetylene black, Ketjen black, channel black, furnace black, lamp black and thermal black, conductive fibers such as carbon fibers and metallic fibers, metallic powders such as carbon fluoride, aluminum and nickel powders, conductive whiskers such as zinc oxide and potassium titanate whiskers, conductive metal oxides such as titanium oxide, and polyphenylene derivatives. Specific examples of commercially available conductive materials include various acetylene black products (available from Chevron Chemical company, Denka Singapore Private Limited and Gulf Oil company), Ketjen Black EC series (available from Armak company), Vulcan XC-72 (available from Cabot company) and Super P (available from Timcal company).

Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

The viscosity controller is a component that controls the viscosity of the electrode mix to facilitate mixing of the electrode mix and application of the same to a current collector, and may be added in an amount of up to 30% by weight, based on the total weight of the anode mix. Examples of the viscosity controller include, but are not limited to, carboxymethyl cellulose and polyvinylidene fluoride. In some cases, the afore-mentioned solvent may also act as the viscosity controller.

The adhesion promoter is an auxiliary ingredient that is added to improve adhesion of an active material to a current collector. The adhesion promoter may be added in an amount of not more than 10% by weight, relative to the binder. Examples of the adhesion promoter include oxalic acid, adipic acid, formic acid, and acrylic acid derivatives and itaconic acid derivatives.

The anode may be produced, for example, by adding an anode mix including an anode active material to a solvent such as NMP to prepare a slurry and applying the slurry to an anode current collector, followed by drying. Optionally, the anode mix may further include other components such as a binder, a conductive material, a filler, a viscosity controller, and an adhesion promoter, which are described above in association with the configuration of the cathode.

The anode current collector is generally fabricated to a thickness of 3 to 500 µm. Any anode current collector may be used without particular limitation so long as suitable conductivity is provided without causing chemical changes in the battery. Examples of the anode current collector include copper, stainless steel, aluminum, nickel, titanium, sintered carbon, copper or stainless steel surface-treated with carbon, nickel, titanium or silver, and aluminum-cadmium alloys. The anode current collector may include fine irregularities on the surface thereof so as to enhance adhesion of anode active materials. In addition, the current collector may be provided in various forms such as a film, a sheet, a foil, a net, a porous structure, a foam and a nonwoven fabric.

Examples of the anode active material include carbon-graphite materials such as natural graphite, artificial graphite, expanded graphite, carbon fiber, non-graphitizing carbon, carbon black, carbon nanotubes, fullerene, and activated carbon, metals alloyable with lithium such as Al, Si, Sn, Ag, Bi, Mg, Zn, In, Ge, Pb, Pt, and Ti, compounds including these elements, complexes of the metals or the compounds thereof with the carbon-graphite materials, and lithium-containing nitrides. Among these materials, carbon-based active materials, tin-based active materials, silicon-based active materials, or silicon-carbon-based active materials are more preferable and may be used singly or in combination of at least two thereof.

The present invention also provides a method for preparing the integrated electrode assembly described above.

The method for preparing the integrated electrode assembly includes the steps of:

(1) homogenizing a linear polymer, monomers for a cross-linked polymer, a liquid-phase component including an ionic salt, a solid-phase component, and a polymerization initiator into a mixture;

(2) coating the mixture on one electrode;

(3) inducing polymerization reaction through UV irradiation or heating to form a separation layer; and (4) placing a counter electrode on the separation layer, followed by pressing.

A conventional method, in which a mold is prepared to form a space between a cathode and an anode and a polymer-monomer mixture is introduced into the space, followed by polymerization, has many process difficulties.

On the other hand, the above method in which the mixture is coated on one electrode, followed by polymerization, can simplify the process. The above method is also suitable for battery performance improvement since, during pressing in step (4), the liquid-phase component of the separation layer partially flows into the electrodes and impregnates the electrodes, improving ionic conductivity of the electrodes.

In step (1), the linear polymer is mixed in the form of a polymer rather than in the form of monomers, such that the linear polymer partially permeates into a cross-linked polymer gel during polymerization into a cross-linked polymer in step (3) to form a physical connection structure.

The present invention also provides a lithium secondary battery including the integrated electrode assembly. The lithium secondary battery may include the integrated electrode assembly and, optionally, a lithium salt-containing non-aqueous electrolyte. In a preferred embodiment, the lithium secondary battery may contain no or only a small amount of lithium salt-containing non-aqueous electrolyte.

This is possible since pressing in step (4) causes the liquid-phase component of the separation layer to partially flow into the electrodes, impregnating the electrodes. Taking into consideration that electrolyte impregnation is a bottleneck in the battery fabrication process, the present invention can provide a secondary battery with high process efficiency.

The present invention also provides a middle or large-sized battery module including the lithium secondary battery as a unit cell and a battery pack including the battery module.

The battery pack may be used in various middle or large-sized devices, especially those requiring high-temperature safety and high rate properties. Examples of the middle or large-sized devices, for which the battery pack may be used as a power source, include, but are not limited to, power tools that are powered by electrical motors, electric vehicles (EVs) including hybrid electric vehicles (HEVs) and plug-in hybrid electric vehicles (PHEVs), electric two-wheeled vehicles including electric bikes (E-bikes) and electric scooters (E-scooters), electric golf carts, and power storage systems.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described with reference to the drawings, which illustrate embodiments of the present invention. However, it should be noted that the description of the embodiments is to provide better understanding of the present invention without limiting the scope of the invention.

Figure 1:
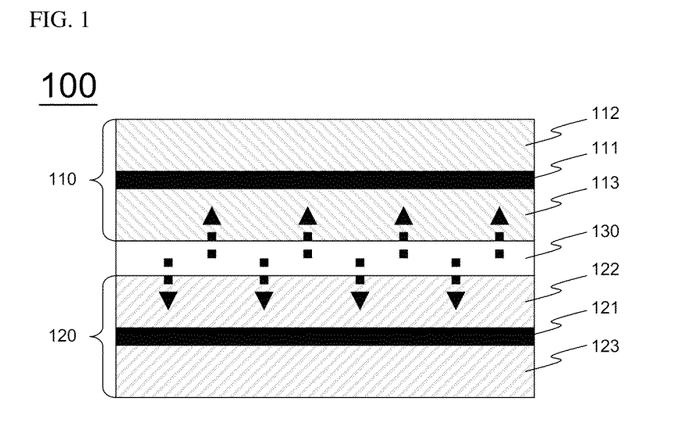
FIG. 1 is a schematic cross-sectional view of an integrated electrode assembly according to one embodiment of the present invention.
Figure 2:
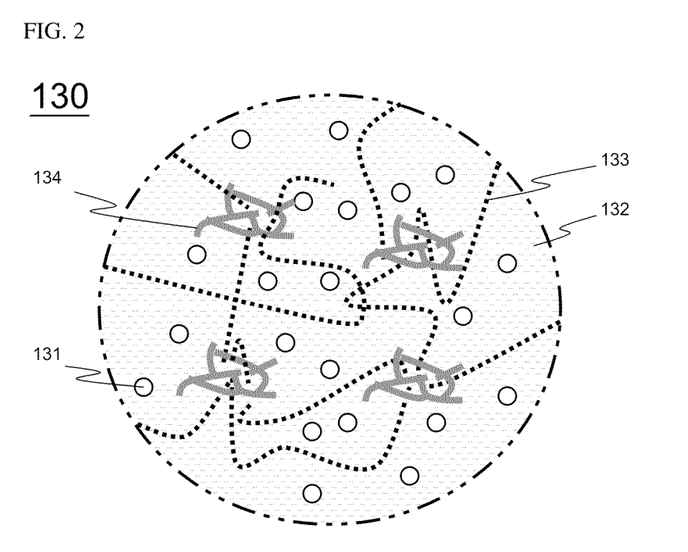
FIG. 2 is a schematic enlarged inside view of a 3-phase separation layer according to one embodiment of the present invention.

FIG. 1 is a schematic cross-sectional view of an integrated electrode assembly according to one embodiment of the present invention and FIG. 2 is a schematic enlarged inside view of a 3-phase separation layer according to one embodiment of the present invention.

As shown in FIGS. 1 and 2, the electrode assembly 100 according to one embodiment of the present invention includes a cathode 110, an anode 120, and a 3-phase separation layer 130. The cathode 110 has a structure in which cathode mixes 112 and 113 are coated on both sides of a cathode current collector 111, the anode 120 has a structure in which anode mixes 122 and 123 are coated on both sides of an anode current collector 121, and the 3-phase separation layer 130 is positioned between the cathode 110 and the anode 120.

The 3-phase separation layer 130 includes a solid-phase component 131, a liquid-phase component 132, and a polymer matrix in which linear polymers 133 and cross-linked polymers 134 form a viscoelastic structure with the solid-phase component 131 and the liquid-phase component 132 being incorporated in the polymer matrix.

Such an integrated electrode assembly has excellent high-temperature safety since the polymer matrix and the solid-phase component do not contract at high temperature, preventing the occurrence of mishaps such as explosion.

In addition, it is possible to increase ionic conductivity of the electrodes 110 and 120, improving battery performance, since the liquid-phase component 132 flows into the electrodes 110 and 120 in an arrow direction shown in FIG. 2, impregnating the electrodes 110 and 120, in an electrode assembly preparation process, for example, in a lamination process. Further, since the electrodes 110 and 120 are uniformly wetted by electrolyte, it is possible to minimize degradation of the electrodes 110 and 120 caused by non-uniform permeation of electrolyte, which is the most serious problem associated with large-area electrodes.

Hereinafter, the present invention will be described in more detail with reference to the following examples. However, it should be noted that the following examples are provided only to illustrate the present invention and the scope of the present invention is not limited thereto.

Example 1

A mixture of an organic electrolyte of 1M $LiPF_6$ in EC:DEC (1:1), PEO, PEGDMA, and $Al_2O_3$ in a weight ratio of 76:15.4:6.6:2 was prepared and benzoin was added as a UV initiator in an amount of 3% by weight relative to PEGDMA to prepare a precursor of a 3-phase separation layer. The precursor was coated on a glass plate, which was then irradiated with ultraviolet light for 1 minute to produce a 3-phase separation layer through photopolymerization.

Comparative Example 1

A mixture of an organic electrolyte of 1M $LiPF_6$ in EC:DEC (1:1), PVdF-HFPPVdF-HFP, and $Al_2O_3$ in a weight ratio of 76:22:2 was prepared, acetone was added as a solvent in an amount of 20% by weight relative to the total weight, and the mixture was homogenized. The mixture was then casted onto a glass plate and acetone was evaporated for 10 hours under an argon gas atmosphere in a glove box to produce a solid electrolyte membrane.

Experimental Example 1

Ionic conductivity and tensile strength were measured for each of the 3-phase separation layer of Example 1 and the solid electrolyte membrane of Comparative Example 1.

Figure 3:
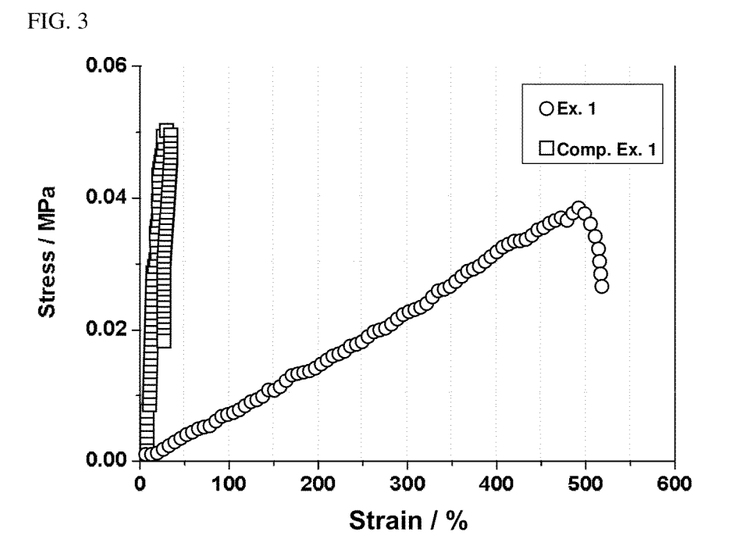
FIG. 3 is a graph showing measurement results of tensile strength according to Example 1 of the present invention.

As a result, Example 1 and Comparative Example 1 exhibited similar levels of ionic conductivity of 1.2 mS/cm and 1.7 mS/cm. On the other hand, as can be seen from FIG. 3, the measurement results of tensile strength showed that the tensile strength of the 3-phase separation layer of Example 1 having a viscoelastic structure was greatly improved over that of the solid electrolyte membrane of Comparative Example 1.

Example 2

Graphite, PVdF and carbon black were added to N-methyl-pyrrolidinone to prepare a slurry and the slurry was applied to a Cu foil. The slurry-applied Cu foil was then dried for 2 hours at about 130° C. to prepare an anode. In addition, $Li(NiMnCo)O_2/LiMnO_2$, PVdF and carbon black were added to N-methyl-pyrrolidinone to prepare a slurry and the slurry was applied to a Cu foil. The slurry-applied Cu foil was then dried for 2 hours at about 130° C. to prepare a cathode.

The 3-phase separation layer precursor of Example 1 was coated on the anode, which was then irradiated with ultraviolet light for 1 minute to produce a 3-phase separation layer through photopolymerization.

The cathode was placed on the anode coated with the 3-phase separation layer, followed by lamination to prepare an integrated electrode assembly. The integrated electrode assembly was then inserted into a pouch without an impregnation process to fabricate a secondary battery.

Comparative Example 2

A polyolefin-based separator was placed between the anode and cathode of Example 2, which was then inserted into a pouch. An electrolyte of 1M $LiPF_6$ in EC:DEC (1:1) was then introduced into the pouch to fabricate a secondary battery.

Experimental Example 2

The secondary batteries of Example 2 and Comparative Example 2 were charged in a constant current (CC) mode at a current density of 0.1 C to 4.2 V and were then maintained in a constant voltage (CV) mode at 4.2 V and charging was completed when current density reached 0.05 C. During discharge, the secondary batteries were discharged in a CC mode at a current density of 0.1 C to 2.5V. Then, charge/discharge was repeated 50 times under the same conditions as above. Results are shown in FIG. 4.

Figure 4:
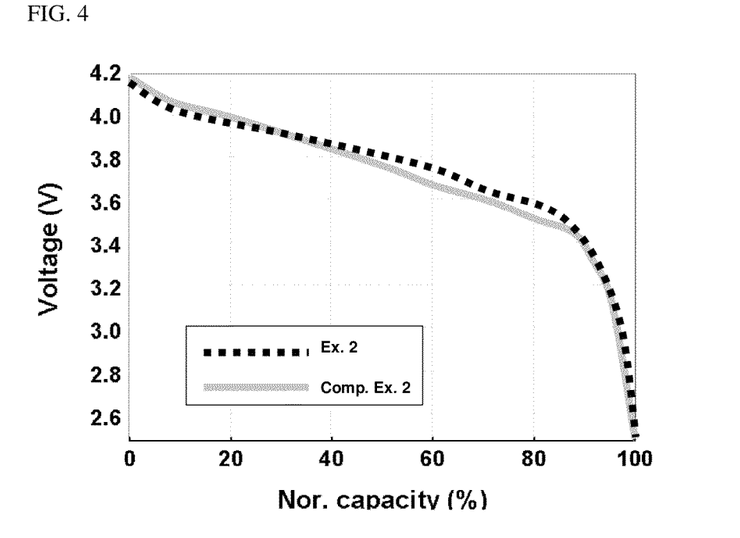
FIG. 4 is a graph showing charge/discharge results according to Example 2 of the present invention.

It can be seen from FIG. 4 that the secondary battery of Example 2 including the integrated electrode assembly employing the 3-phase separation layer exhibits charge/discharge properties similar to the secondary battery of Comparative Example 2 employing the liquid electrolyte and the separator although the secondary battery of Example 2 has not been subjected to an impregnation process. Therefore, the secondary battery of Example 2 is free from the problem of poor impregnation of electrolyte which has been pointed out as a problem of the solid electrolyte.

INDUSTRIAL APPLICABILITY

As is apparent from the above description, an integrated electrode assembly according to the present invention has an advantage in that it is possible to prevent short-circuiting due to separator contraction. In addition, electrolyte is impregnated into the electrodes during preparation of the electrode assembly. Therefore, it is possible to greatly alleviate the problem of increased process time and the problem of non-uniform electrodes associated with wetting. It is also possible to improve ionic conductivity of the electrodes.

It will be apparent to those skilled in the art that various applications and modifications can be made based on the above description without departing from the scope of the invention.

The invention claimed is:

1. An integrated electrode assembly comprising a cathode, an anode, and a separation layer disposed between the cathode and the anode, wherein the cathode, the anode, and the separation layer are integrated with each other,
   the separation layer comprises 3 phases comprising a liquid-phase component containing an ionic salt, a solid-phase component supporting the separation layer between the cathode and the anode, and a polymer matrix in which linear polymers and cross-linked polymers form a viscoelastic structure with the liquid-phase component and the solid-phase component being incorporated in the polymer matrix,
   the polymer matrix is coupled to each of the cathode and the anode, and
   wherein the liquid-phase component of the separation layer is present in the cathode and the anode to increase ionic conductivity of the cathode and the anode, wherein the viscoelastic structure includes independent gels, each comprising the cross-linked polymers which are physically connected to each other by the linear polymers, and wherein the viscoelastic structure being impregnated with the liquid-phase component, and
   the linear polymers provide a physical connection structure in the form of parts of the linear polymer permeating into the gels of the cross-linked polymers.

2. The integrated electrode assembly according to claim 1, wherein the linear polymers comprise at least one selected from the group consisting of a polyoxide-based non-cross-linked polymer and a polar non-cross-linked polymer.

3. The integrated electrode assembly according to claim 1, wherein a weight ratio of the linear polymer to the cross-linked polymer is 1:9 to 8:2.

4. The integrated electrode assembly according to claim 1, wherein the separation layer comprises 2 to 80% by weight of the solid-phase component based on the weight of the polymer matrix.

5. The integrated electrode assembly according to claim 1, wherein the liquid-phase component is an electrolyte containing an ionic salt.

6. The integrated electrode assembly according to claim 5, wherein the ionic salt is a lithium salt.

7. The integrated electrode assembly according to claim 6, wherein the lithium salt comprises at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, and lithium tetraphenylborate.

8. The integrated electrode assembly according to claim 5, wherein the electrolyte comprises at least one selected from the group consisting of ethylene carbonate, propylene carbonate, butylene carbonate, vinylene carbonate, diethyl carbonate, dimethyl carbonate, ethyl methyl carbonate, gamma-butyrolactone, sulfolane, methyl acetate, and methyl propionate.

9. The integrated electrode assembly according to claim 1, wherein the solid-phase component is a solid compound that is not reactive with lithium ions and comprises solid-phase particles having a mean particle diameter of 10 nm to 5 μm.

10. The integrated electrode assembly according to claim 9, wherein the solid compound comprises at least one selected from the group consisting of an oxide, a nitride, and a carbide that are not reactive with lithium ions.

11. The integrated electrode assembly according to claim 10, wherein the oxide that is not reactive with lithium ions comprises at least one selected from the group consisting of MgO, TiO$_2$ (rutile) and Al$_2$O$_3$.

12. The integrated electrode assembly according to claim 1, wherein the linear polymer comprises at least one selected from the group consisting of a polyoxide-based non-cross-linked polymer and a polar non-cross-linked polymer.

13. The integrated electrode assembly according to claim 12, wherein the polyoxide-based non-cross-linked polymer comprises at least one selected from the group consisting of poly(ethylene oxide), poly(propylene oxide), poly(oxymethylene), and poly(dimethylsiloxane).

14. The integrated electrode assembly according to claim 12, wherein the polar non-cross-linked polymer comprises at least one selected from the group consisting of polyacrylonitrile, poly(methyl methacrylate), poly(vinyl chloride), poly(vinylidene fluoride), poly(vinylidenefluoride-co-hexafluoropropylene), poly(ethylene imine), and poly(p-phenylene terephthalamide).

15. The integrated electrode assembly according to claim 1, wherein the cross-linked polymers comprise a polymer obtained from monomers having at least two functional groups or a copolymer obtained from monomers having at least two functional groups and polar monomers having one functional group.

16. The integrated electrode assembly according to claim 15, wherein the monomers having at least two functional groups comprise at least one selected from the group consisting of trimethylolpropane ethoxylate triacrylate, polyethylene glycol dimethacrylate, polyethylene glycol diacrylate, divinylbenzene, polyester dimethacrylate, divinyl ether, trimethylolpropane, trimethylolpropane trimethacrylate, and ethoxylated bis phenol A dimethacrylate.

17. The integrated electrode assembly according to claim 15, wherein the polar monomers having one functional group comprise at least one selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

18. A method for preparing the integrated electrode assembly according to claim 1, the method comprising:
   (1) homogenizing linear polymers, monomers for cross-linked polymers, a liquid-phase component comprising an ionic salt, a solid-phase component, and a polymerization initiator into a mixture;
   (2) coating the mixture on one electrode;
   (3) inducing polymerization reaction through UV irradiation or heating to form a separation layer; and
   (4) placing a counter electrode on the separation layer, followed by pressing.

19. A lithium secondary battery comprising the integrated electrode assembly according to claim 1.

20. A battery module comprising the lithium secondary battery according to claim 19 as a unit battery.

21. A battery pack comprising the battery module according to claim 20.

22. The battery pack according to claim 21, wherein the battery pack is used as a power source of a middle or large-sized device.

23. The battery pack according to claim 22, wherein the middle or large-sized device is an electric vehicle, a hybrid electric vehicle, a plug-in hybrid electric vehicle, or a power storage system.

* * * * *